(No Model.) 2 Sheets—Sheet 1.

J. U. S. SANDS.
LUMBER MEASURE AND REGISTER.

No. 370,212. Patented Sept. 20, 1887.

WITNESSES:
C. Neveux
C. Sedgwick

INVENTOR:
J. U. S. Sands
BY Munn & Co
ATTORNEYS.

N. PETERS, Photo-Lithographer, Washington, D. C.

(No Model.) 2 Sheets—Sheet 2.

J. U. S. SANDS.
LUMBER MEASURE AND REGISTER.

No. 370,212. Patented Sept. 20, 1887.

WITNESSES:
C. Neveux
C. Sedgwick

INVENTOR:
J. U. S. Sands
BY Munn & Co
ATTORNEYS.

UNITED STATES PATENT OFFICE.

JOHN U. S. SANDS, OF BELMOND, IOWA.

LUMBER MEASURE AND REGISTER.

SPECIFICATION forming part of Letters Patent No. 370,212, dated September 20, 1887.

Application filed April 11, 1887. Serial No. 234,419. (No model.)

*To all whom it may concern:*

Be it known that I, JOHN U. S. SANDS, of Belmond, in the county of Wright and State of Iowa, have invented a new and Improved Calculator and Register, of which the following is a full, clear, and exact description.

The object of my invention is to provide a new and improved device for calculating the surface or board measure of lumber of any given length and for registering the several measures taken.

The invention also consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
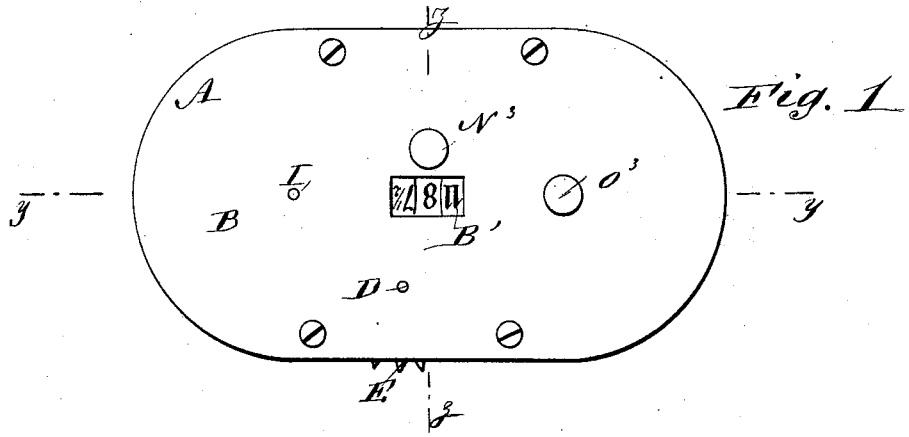
Figure 2:
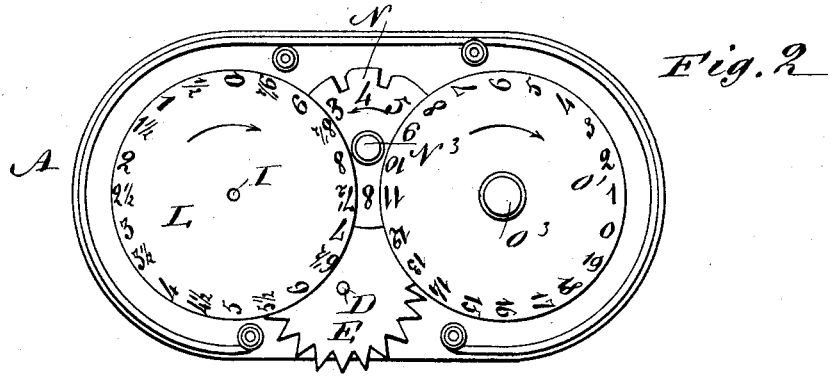
Figure 3:
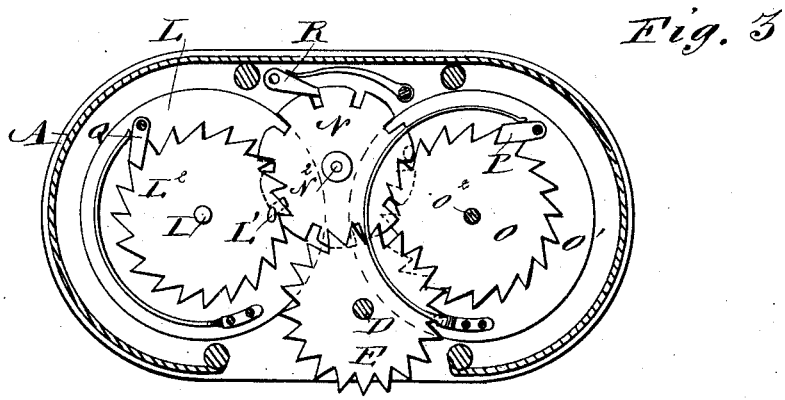
Figure 4:
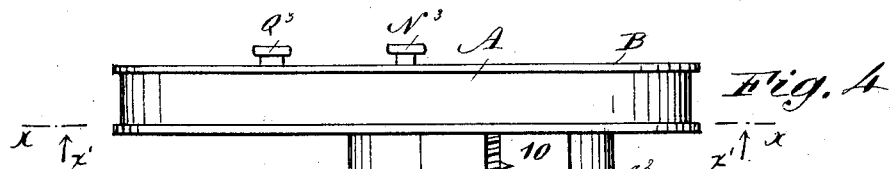
Figure 5:
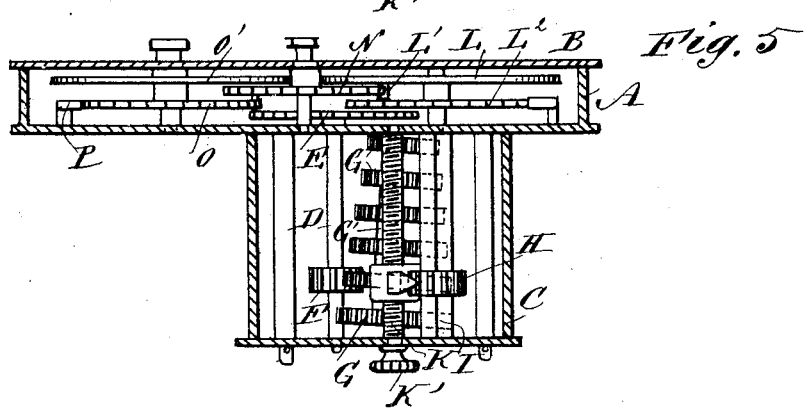
Figure 6:
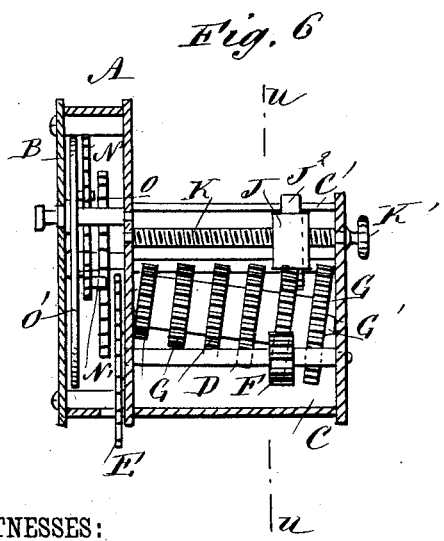
Figure 7:
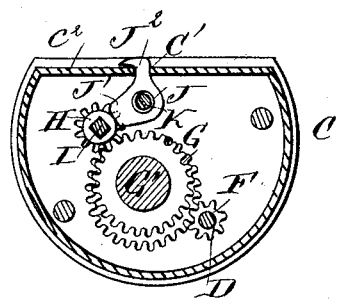

Figure 1 is a front elevation of my improvement. Fig. 2 is a similar view of the same with the front plate removed. Fig. 3 is a sectional rear elevation of the same on the line $x\,x$ of Fig. 4, looking in the direction of the arrow $x'$. Fig. 4 is a plan view of my improvement. Fig. 5 is a sectional plan view of the same on the line $y\,y$ of Fig. 1. Fig. 6 is a vertical cross-section of the same on the line $z\,z$ of Fig. 1, and Fig. 7 is a sectional elevation of the same on the line $u\,u$ of Fig. 6.

My improvement is provided with a casing, A, having a removable front plate, B, provided with an opening, B', in its middle, through which appear the numerals representing the number of feet measured. From the rear of the casing A extends a box, C, which serves as a handle when using the machine, and in the casing A is journaled a shaft, D, carrying the driving-wheel E, having on its rim sharp-pointed teeth extending through a slot formed in the bottom of the casing A. The pointed teeth are adapted to engage the board to be measured when the casing is moved across the width of the same. On the shaft D is also secured, in the box C, a pinion, F, meshing into one of a series of gear-wheels, G, secured to a common shaft, G', journaled in an inclined position in the box C. The gear-wheels G are arranged conically on the shaft G' and are increased in diameter from the front of the box toward its rear, and are adapted to mesh into a pinion, H, mounted to slide on and turn a shaft, I, having its bearings in the box C and extending at its front end into the casing A. The shaft I is parallel with the outer edges of said gear-wheels G, so that the pinion H, on being moved forward or backward on said shaft I, engages successively the several gear-wheels G.

The pinion H is moved sidewise on the shaft I by means of a forked arm, J', formed on a nut, J, screwing on the threaded rod K, journaled in the box C and extending toward the rear beyond said box, carrying on its outer end a knob, K', for turning said rod K. The nut J is also provided with a pointer or lug, $J^2$, extending upward through a slot, C', formed on the top plate, $C^2$, of the box C. The pointer or lug $J^2$ is adapted to register with numerals indicating the length of the lumber to be measured, said numerals being marked on the top plate, $C^2$, of the box C, as indicated in Fig. 4.

On the end of the shaft I, extending into the casing A, is secured a unit-disk, L, provided on its outer face, near its periphery, with the successively-arranged numerals from 0 to 9, with subdivisions of ½. On the face of the disk L is secured a pin or lug, L', adapted to engage at each revolution of said disk one tooth formed on the central or tens disk, N, mounted to rotate in the casing A and provided with ten teeth marked with the numerals from 0 to 9, successively. On the disk N is secured a pin or lug, N', adapted to engage at every revolution a tooth of the ratchet-wheel O, secured to the hundreds-disk O', mounted in suitable bearings in the casing A and provided on its face with the numerals from 0 to 19, arranged successively near its periphery. A spring-pawl, P, pivoted on the back plate of the casing A, engages the ratchet-wheel O and prevents it from turning in the wrong direction, and similar pawls, Q and R, also pivoted on the plate B, engage, respectively, the ratchet-wheel $L^2$, formed on the face of the disk L, and the tens-wheel N, so as to prevent them from turning in the wrong direction.

The units, tens, and hundreds disks L, N, and O' are so arranged in connection with the opening B' in the plate B that one of the numerals of each disk appears in the said opening B', indicating in feet and subdivisions of the same the total amount of surface of the lumber measured. The shafts N² and O², carrying the disks N and O', respectively, project through the front plate, B, and are provided on their outer ends with knobs N³ and O³, respectively, serving to turn said disks back to zero when the operator is starting to use the device.

The operation is as follows: When it is desired to measure the surface of lumber of different widths, but of a certain length—say fourteen feet—then the operator turns the knob K' until the pointer J² registers with the numeral 14 on the top plate, C², of the box C, the several disks L, N, and O' having been previously set to indicate zero at the opening B' in the front plate, B. The operator now takes hold of the box C with one hand and runs it across the width of the lumber to be measured, so that the teeth of the main driving-wheel E travel on the lumber and turn the wheel E and its shaft D, which latter, by means of its pinion F, meshing into either of the gear-wheels G, imparts a rotary motion to the shaft G', carrying all the wheels G. The pinion H, held on the shaft I, meshes in one of the wheels G, the number of teeth on which correspond to the numeral 14, to which the pointer J² is set. The shaft I is thus turned and revolves the toothed disk L, which indicates the desired measure of the lumber in the aperture B'. The second piece of lumber is measured in the same manner; but the amount of its surface measure is added to the first measure, and when the unit-disk L has made a revolution, then by its pin or lug L' it engages the tens-wheel N, which is thus turned the distance of one tooth, so that the numeral 1 appears in the opening B', thereby indicating that ten square feet of lumber have been measured. The measuring is continued, as described, over each piece of lumber, and when the tens-wheel N has made one complete revolution, then it turns, by means of its lug N' engaging the ratchet-wheel O, the hundreds-disk O' the distance of one tooth, so that the figure 1 of the hundreds disk O' appears in the opening B', thereby indicating that one hundred square feet of lumber have been measured.

When it is desired to measure lumber of different widths but of the same length—say twenty feet—then the operator turns the knob K' until the pointer J² stands at the numeral 20 on the top plate, C², of the box C, whereby the pinion H is moved into mesh with the last and largest gear-wheel G. The toothed disk L is then turned to its zero-point by turning the driving-wheel E, and the tens-disk N is then set to zero by turning the knob N³ until the numeral 0 appears at the opening B', and in a similar manner the hundred-disks O' is turned by its knob O³ until the numeral 0 appears at the opening B'. The operation above described is then repeated.

As shown in the drawings, the driving-wheel E, in making three complete revolutions, travels the distance of one foot. The pinion F is provided with six teeth and meshes into the gear-wheel G having eighteen teeth, so that when the main driving-wheel E has traveled the distance of one foot the gear-wheel G has made one revolution. The difference in the number of teeth on the several gear-wheels G causes the pinion H on the shaft I to turn faster or slower, according to the size of the respective gear-wheel G with which it is in mesh, so that the toothed disk L indicates the measure of the particular gear-wheel G with which said pinion H is geared.

Having thus described my invention, what I claim as new, and desire to secure by Letters Patent, is—

1. In a lumber calculator and register, a toothed wheel adapted to travel on the lumber to be measured, a shaft carrying said toothed wheel, and a pinion mounted on said shaft, in combination with a set of different gear-wheels secured to a shaft, one of said gear-wheels being in mesh with said pinion, a shaft held parallel with the outer edges of said different gear-wheels, a pinion adapted to slide crosswise on said shaft for meshing in said different gear-wheels, and the screw carrying a nut provided with a pointer and having a forked arm adapted to shift the sliding pinion, substantially as shown and described.

2. In a lumber calculator and register, a toothed wheel adapted to travel on the lumber, a shaft carrying said wheel, and a pinion mounted on said shaft, in combination with a set of different gear-wheels secured to a shaft, one of said gear-wheels being in mesh with said pinion, a shaft held parallel with the outer edges of said different gear-wheels, a pinion adapted to slide crosswise on said shaft for meshing in said different gear-wheels, a screw-rod held parallel with said gear-wheels, and a flanged nut screwing on said screw-rod and adapted to shift said pinion on said shaft, substantially as shown and described.

3. In a lumber calculator and register, a toothed wheel adapted to travel on the lumber, a shaft carrying said wheel, and a pinion mounted on said shaft, in combination with a set of different gear-wheels secured to a shaft, one of said wheels being in mesh with said pinion, a shaft held parallel with the outer edges of said different gear-wheels, a pinion adapted to slide crosswise on said shaft for meshing in said different gear-wheels, a unit-disk held on said shaft and provided with numerals indicating the square feet of lumber measured, and the screw carrying a nut provided with a pointer and having a forked arm adapted to shift the sliding pinion, substantially as shown and described.

4. In a lumber calculator and register, a toothed wheel adapted to travel on the lumber, a shaft carrying said wheel, a pinion mounted on said shaft, and a set of different gear-wheels secured to a shaft, one of which gear-wheels is operated by said pinion, in combination with a shaft held parallel to the outer edge of said set of gear-wheels, a pinion adapted to slide crosswise on said shaft for meshing in said different gear-wheels, a unit-disk held on said shaft and provided with a pin, a tens-disk operated the distance of one tooth at each revolution of said unit-disk, and the screw carrying a nut provided with a pointer and having a forked arm adapted to shift the sliding pinion, substantially as shown and described.

5. In a lumber calculator and register, a toothed wheel adapted to travel on the lumber, a shaft carrying said wheel, a pinion mounted on said shaft, and a set of different gear-wheels secured to a shaft, one of which gear-wheels is operated by said pinion, in combination with a shaft held parallel with the outer edges of said set of gear-wheels, a pinion adapted to slide crosswise on said shaft for meshing in said different gear-wheels, a unit-disk held on said shaft and provided with a pin, a tens-disk operated the distance of one tooth at each revolution of the said unit-disk, a hundreds-disk turned the distance of one tooth at every revolution of said tens-disk, and the screw carrying a nut provided with a pointer and having a forked arm adapted to shift the sliding pinion, substantially as shown and described.

6. In a lumber calculator and register, the combination, with a series of different gear-wheels secured to a shaft, of a shaft held parallel with the outer edges of said different gear-wheels, a pinion adapted to slide crosswise on said shaft and turning with the same, a screw-rod held parallel with said shaft, a flanged nut screwing on said screw-rod and adapted to move said pinion, and a pointer secured to said nut indicating the respective position of said pinion in relation to the different gear-wheels, substantially as shown and described.

JOHN U. S. SANDS.

Witnesses:
  E. S. HUBBARD,
  SAMUEL ADAMS.